(12) United States Patent
    Cottrell

(10) Patent No.: US 9,261,361 B2
(45) Date of Patent: *Feb. 16, 2016

(54) ENHANCING DEPTH PERCEPTION

(71) Applicant: Kenneth Cottrell, Dorchester, MA (US)

(72) Inventor: Kenneth Cottrell, Dorchester, MA (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/785,923

(22) Filed: Mar. 5, 2013

(65) Prior Publication Data

US 2014/0252236 A1   Sep. 11, 2014

Related U.S. Application Data

(63) Continuation of application No. 13/041,958, filed on Mar. 7, 2011, now Pat. No. 8,410,913.

(51) Int. Cl.
*G08B 3/00* (2006.01)
*G01C 3/04* (2006.01)
*G02C 11/00* (2006.01)

(52) U.S. Cl.
CPC . *G01C 3/04* (2013.01); *G02C 11/10* (2013.01)

(58) Field of Classification Search
CPC ..... G01S 17/08; G01S 7/4812; G01S 7/4813; G01S 7/4972; G01C 3/00; G01C 3/08; G01C 15/002; G01C 21/26; G01C 21/20
USPC ................ 340/391.1, 539.1, 539.11, 539.21, 340/539.13, 539.23, 573.1, 600, 555–557; 356/3.01, 3.11, 4.01, 5.01; 381/58, 105
See application file for complete search history.

(56) References Cited

U.S. PATENT DOCUMENTS

| | | | |
|---|---|---|---|
| 5,014,123 A | 5/1991 | Imoto | |
| 5,032,903 A | 7/1991 | Suzuki | |
| 5,041,866 A | 8/1991 | Imoto | |
| 5,096,286 A | 3/1992 | Weisgerber | |
| 5,157,518 A | 10/1992 | Ohtaki | |
| 5,177,621 A | 1/1993 | Ohtaki | |
| 5,758,201 A | 5/1998 | Watanabe et al. | |
| 5,926,153 A | 7/1999 | Ohishi | |
| 6,500,008 B1 | 12/2002 | Ebersole | |
| 6,809,743 B2 | 10/2004 | Ebersole | |
| 6,809,744 B2 | 10/2004 | Ebersole | |
| 6,859,417 B1 * | 2/2005 | Houg | 367/96 |
| 6,924,792 B1 | 8/2005 | Jessop | |
| 6,989,831 B2 | 1/2006 | Ebersole | |
| 7,220,000 B2 | 5/2007 | Alster | |
| 7,310,080 B2 | 12/2007 | Jessop | |
| 7,344,279 B2 | 3/2008 | Mueller | |
| 7,366,457 B2 | 4/2008 | Ono | |
| 7,629,400 B2 | 12/2009 | Hyman | |
| 8,269,951 B1 * | 9/2012 | Courchesne | 356/5.01 |
| 8,410,913 B2 * | 4/2013 | Cottrell | 340/391.1 |
| 2002/0021832 A1 | 2/2002 | Dawson | |
| 2002/0092019 A1 | 7/2002 | Marcus | |
| 2002/0197591 A1 | 12/2002 | Ebersole | |
| 2003/0003430 A1 | 1/2003 | Ebersole | |
| 2003/0035917 A1 | 2/2003 | Hyman | |
| 2003/0046401 A1 | 3/2003 | Abbott | |
| 2003/0065588 A1 | 4/2003 | Rubinstenn | |
| 2003/0223038 A1 | 12/2003 | Alster | |
| 2004/0052076 A1 | 3/2004 | Mueller | |
| 2005/0047134 A1 | 3/2005 | Mueller | |

(Continued)

*Primary Examiner* — Ang V La
(74) *Attorney, Agent, or Firm* — Fish & Richardson P.C.

(57) ABSTRACT

Apparatuses and methods enhance depth perception, e.g., the depth perception of a human being using an apparatus worn on the user's head.

24 Claims, 2 Drawing Sheets

(56) References Cited

U.S. PATENT DOCUMENTS

| | | |
|---|---|---|
| 2005/0122477 A1 | 6/2005 | Alster |
| 2005/0174473 A1 | 8/2005 | Morgan |
| 2005/0276053 A1 | 12/2005 | Nortrup |
| 2005/0285835 A1 | 12/2005 | Jessop |
| 2006/0002750 A1 | 1/2006 | Ono |
| 2006/0015904 A1 | 1/2006 | Marcus |
| 2006/0281543 A1 | 12/2006 | Sutton |
| 2007/0070062 A1 | 3/2007 | Boll |
| 2007/0080905 A1 | 4/2007 | Takahara |
| 2007/0146325 A1 | 6/2007 | Poston |
| 2009/0005961 A1 | 1/2009 | Grabowski |
| 2011/0164242 A1 | 7/2011 | Pernstich et al. |
| 2012/0113407 A1* | 5/2012 | Wang .................. 356/4.01 |
| 2013/0077081 A1* | 3/2013 | Lin ..................... 356/3.01 |
| 2013/0271744 A1* | 10/2013 | Miller et al. ............ 356/4.01 |

\* cited by examiner

ENHANCING DEPTH PERCEPTION

CROSS-REFERENCE TO RELATED APPLICATION

This application is a continuation of and claims priority to U.S. Ser. No. 13/041,958, filed on Mar. 7, 2011, which is hereby incorporated by reference.

FIELD

This description relates to enhancing depth perception, e.g., enhancing depth perception of a human being using an apparatus worn on the user's head.

BACKGROUND

Depth perception is the ability of a human being to perceive three dimensions in the field of vision, including the distance at which a viewed object may be from the viewer. Depth perception is achieved in part by stereopsis, which is a process by which two slightly different images received by two eyes can be combined to assess depth and distance information by the brain. Stereopsis plays a greater role in depth perception when a viewed object is not moving or moving very slowly and also plays a greater role in depth perception when a viewed object is relatively close to the viewer. If a person lacks vision in one eye, the person can still see using the remaining eye but will lack a complete ability to perceive depth. Depth perception plays a key role in a variety of human activities including cutting foods, pouring liquids into a cup, playing sports involving catching and throwing, parking a car, sewing, firefighting, shaking hands, and aligning objects.

SUMMARY

In a general aspect, an apparatus includes: a frame configured to be worn on a human head; a rangefinder mechanism configured to measure a distance of an object, a transducer configured to receive the distance signal from the rangefinder mechanism and configured to transmit an audio signal; and a speaker configured to receive the audio signal and to emit an audible tone, the speaker attached to the frame. The rangefinder mechanism includes: a transmitter of a reflectable signal, a receiver of the reflectable signal, and output circuitry configured to transmit a distance signal indicative of a location of the object. The rangefinder mechanism is attached to the frame and oriented such that the transmitter of the reflectable signal emits the reflectable signal in a direction parallel to a line of sight of the eyes of a user wearing the frame.

Implementations of this aspect may include the following features.

Some embodiments include a user control configured or operable to adjust a frequency range of the audio signal.

Some embodiments include a user control configured or operable enable and disable the speaker.

In some embodiments, the reflectable signal comprises an infrared signal.

In some embodiments, the frame comprises an eyeglass frame.

In some embodiments, in which the speaker comprises a configurable output frequency range.

In some embodiments, the audible tone produced by the speaker changes as the distance signal changes. In some cases, the audible tone produced by the speaker increases in frequency as the distance signal indicates a decreasing distance. In some cases, the audible tone produced by the speaker decreases in frequency as the distance signal indicates a decreasing distance.

Some embodiments include an eye tracker.

In a general aspect, a method includes: measuring a distance of an object by emitting a reflectable signal in a direction parallel to a line of sight of eyes of a user wearing a frame configured to be worn on a human head; generating a distance signal indicative of a location of the object, the distance signal based on the reflectable signal; generating an audio signal based on the distance signal; and emitting an audible tone corresponding to the audio signal.

Aspects can include one or more of the following advantages. A human being can regain the perception of depth by audio cues provided by a comfortable and lightweight device.

Other features and advantages will become apparent from the following description, and from the claims.

DESCRIPTION

A device that provides audio cues about the distance of a viewed object from the viewer can enhance the depth perception, for example the depth perception of a human being lacking vision in one eye. A human being having vision in two eyes can perceive depth through multiple visual cues, including a method of triangulation called stereopsis. The brain performs stereopsis by evaluating an offset of an object perceived by each eye to determine whether the object is near to the eyes (in which case there is a perceivable offset) or whether the object is far away from the eyes (in which case there is little or no perceivable offset). If stereopsis is not possible, for example, because one eye is impaired or lacks functionality, the device that provides audio cues about the distance of a viewed object can substitute for traditional depth perception.

Figure 1:
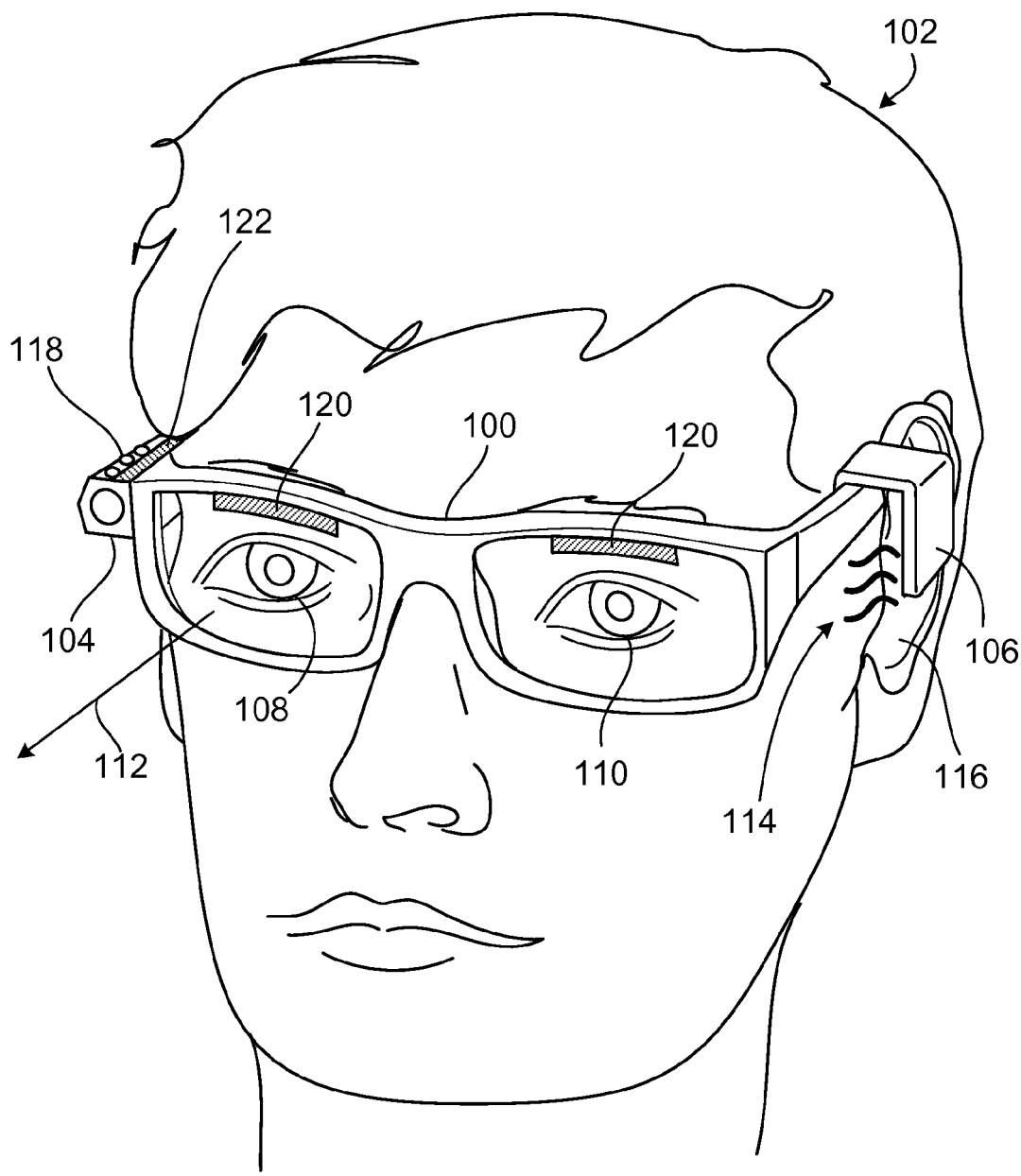
FIG. 1 is an audio cue device.

FIG. 1 shows an audio cue device 100 for enhancing depth perception. The audio cue device 100 provides audio cues to a human being 102 wearing the device. The audio cue device 100 has a distance sensor 104 for evaluating distance from the human being 102 and an audio output 106 for generating sound representing the audio cues. The audio cues indicate distance information to the human being 102. For example, the audio cues can indicate information to the human being 102 about the distance between the human being 102 and an object in the field of vision of the human being 102. Here, a distant object is an object at some measurable distance from a fixed point of view.

The distance sensor 104 is located on the audio cue device 100 near the eyes 108, 110 of the human being 102 and faces in the same direction 112 as the eyes. This arrangement provides the distance sensor 104 with an unobstructed path to the same objects in the field of view of the human being 102.

The distance sensor 104 can be a device that transmits a signal and receives back the signal after it has been reflected off of a distant object. For example, the distance sensor 104 can be a rangefinder mechanism that transmits and receives back signals. One or more of several different types of signals (e.g., such as infrared (optical), sonar (acoustic), radar (radio), laser (optical)) can be used. In some instances, another signal that can be reflected back to the distance sensor 104 is used. The distance sensor 104 uses the received reflected signal to determine the distant object's distance from the distance sensor 104, and, therefore, approximately the distance from the human being 102 wearing the audio cue device 100.

In some implementations, the distance sensor 104 measures the absolute distance between a distant object and the distance sensor 104. For example, the distance sensor 104 can use triangulation, which is a process in which the distance sensor 104 determines the location of a distant object by measuring angles between reflected signals and fixed points at known locations. If the distance sensor 104 is performing triangulation, the distance sensor 104 could transmit two signals each having a point of origination offset from one another and receive the signals reflected from the distant object. The distance sensor 104 could then measure the angles of the reflected signals relative to the offset points of origination to calculate the absolute distance between the distant object and the distance sensor 104.

In some implementations, the signal transmitted by the distance sensor 104 provides information about the luminosity of a distant object when reflected off of the object. Luminosity is a measure of brightness of an object. The distance of a distant object corresponds to the measured luminosity of the object when an optical signal is reflected off of the object. An object that is closer to the point of transmission of the optical signal has a greater measured luminosity than an object farther from the point of transmission of the optical signal. Thus, a rangefinder mechanism that uses an optical signal measures distance based on the luminosity of a distant object when the distant object is illuminated by the optical signal. For example, a rangefinder mechanism that uses an infrared signal measures distance based on the luminosity of a distant object when the distant object is illuminated by the infrared signal.

The audio cue device 100 uses the distance evaluated by the distance sensor 104 to provide corresponding audio cues using the audio output 106. The audio output 106 is a device such as a speaker that emits sound waves 114 that can be detected by an ear 116 of the human being 102. The sound waves 114 vary depending on a distant object's distance from the human being 102.

In some implementations, the sound waves 114 generated by the audio output 106 are a continuous tone that varies in frequency based on the distance of a distant object. For example, if the distance sensor 104 has determined that a distant object is relatively nearby, then the audio output 106 generates sound waves 114 at the high end of the frequency of audio perceivable by a human ear. If the distance sensor 104 has determined that a distant object is relatively far away, then the audio output 106 generates sound waves 114 at the low end of the frequency of audio perceivable by a human ear.

Upon hearing the sound waves 114, the human being 102 can evaluate the distance of a distant object in his field of vision. A human being 102 who lacks depth perception due to visual impairment and who has had experience correlating the perceived frequency of the sound waves 114 with the corresponding distances of distant objects can regain some of the depth perception ability lost.

The range of potential frequencies of the sound waves 114 can be chosen to correspond to the distances at which distant objects may be visible to the human being 102 and may be similarly detectable by the distance sensor 104. The lowest frequency perceptible by the ears of the human being 102 can be chosen to correspond to the farthest distance at which an object can still be visible to the human being 102. The highest frequency perceptible by the ears of the human being 102 can be chosen to correspond to the shortest distance at which an object can still be visible to the human being 102 (for example, immediately in front of the human being 102).

In some examples, a human being 102 may be able to perceive frequencies ranging from 20 Hz to 20 kHz. In these examples, the audio output 106 generates sound waves 114 having a frequency closer to 20 Hz when a distant object is at the farthest distance from the human being 102 while still detectable by the distance sensor 104. Also, the audio output 106 generates sound waves 114 having a frequency closer to 20 kHz when a distant object is at a very close distance from the human being 102 (for example, immediately in front of the human being 102). Distant objects of intermediate distance will cause the audio output 106 to generate sound waves 114 having intermediate frequency relative to the distance of the object. The frequencies can correlate to distance in a linear fashion, for example.

In some implementations, the frequencies of the sound waves 114 generated by the audio output 106 can be configured to suit a particular human being and his range of hearing. For example, if a particular human being can only perceive frequencies of up to 15 kHz, he can configure the audio cue device 100 to a frequency range with a highest output frequency of about 15 kHz. Also, if a particular human being finds high frequencies uncomfortable to hear, he can configure the audio cue device 100 to a frequency range with a lower highest output frequency, such as 12 kHz or 10 kHz or any other value supported by the audio output 106.

Generally, the distance sensor 104 evaluates the distance of an object in a direct line of sight of the distance sensor 104 and thus about the same line of sight as the human being 102 when the human being 102 is looking straight ahead relative to the position of the head. However, the distance sensor 104 could also evaluate multiple distant objects simultaneously, for example, by sending out multiple signals reflected off of multiple distant objects. The audio cues provided by the audio output 106 could provide audio information about multiple distant objects, for example, by providing various tones other than a continuous tone.

In some implementations, the audio cue device 100 changes the orientation or line of sight of the distance sensor 104 to correspond to a direction that an eye of the human being 102 is oriented, for example, as the human being 102 moves his pupils to track an object. For example, the audio cue device 100 could include eye tracking functionality and use that information to control the position of the distance sensor 104. In some embodiments, audio cue device 100 includes optional eye tracker 120 (e.g., a non-contact, optical mechanism for measuring eye motion). These eye trackers rely on light, typically infrared, that is reflected from the eye and sensed by a video camera or some other specially designed optical sensor. A control system (not shown) can be used to analyze the reflected light to extract eye rotation from changes in reflections. The control system can adjust the orientation of the distance sensor 104 using an adjustable mount 122.

The exemplary audio cue device 100 resembles a pair of conventional eyeglasses and can be constructed using a conventional eyeglass frame as a base component. In some examples, the human being 102 may require corrective lenses to correct impaired vision in a functioning eye and so the audio cue functionality (e.g., the distance sensor 104 and audio output 106) can be attached to a pair of vision-correcting eyeglasses. The eyeglass frames could also be fitted with non-corrective lenses for individuals who do not need vision correction. In some implementations, a support structure other than an eyeglass frame can be used. For example, some audio cue devices include similar components mounted on a hat such as a military helmet or a construction worker's hard hat.

In some implementations, the audio cue device 100 includes user controls 118. For example, the audio cue device 100 may have an on/off switch that allows the human being 102 to deactivate the audio cue device 100 when the human being 102 does not wish to hear the audio signal provided by the audio output 106. The audio cue device 100 may also have a configurable frequency output range and the user controls 118 could include a knob or other controls that can adjust the range of frequencies produced by the audio output 106.

Figure 2:
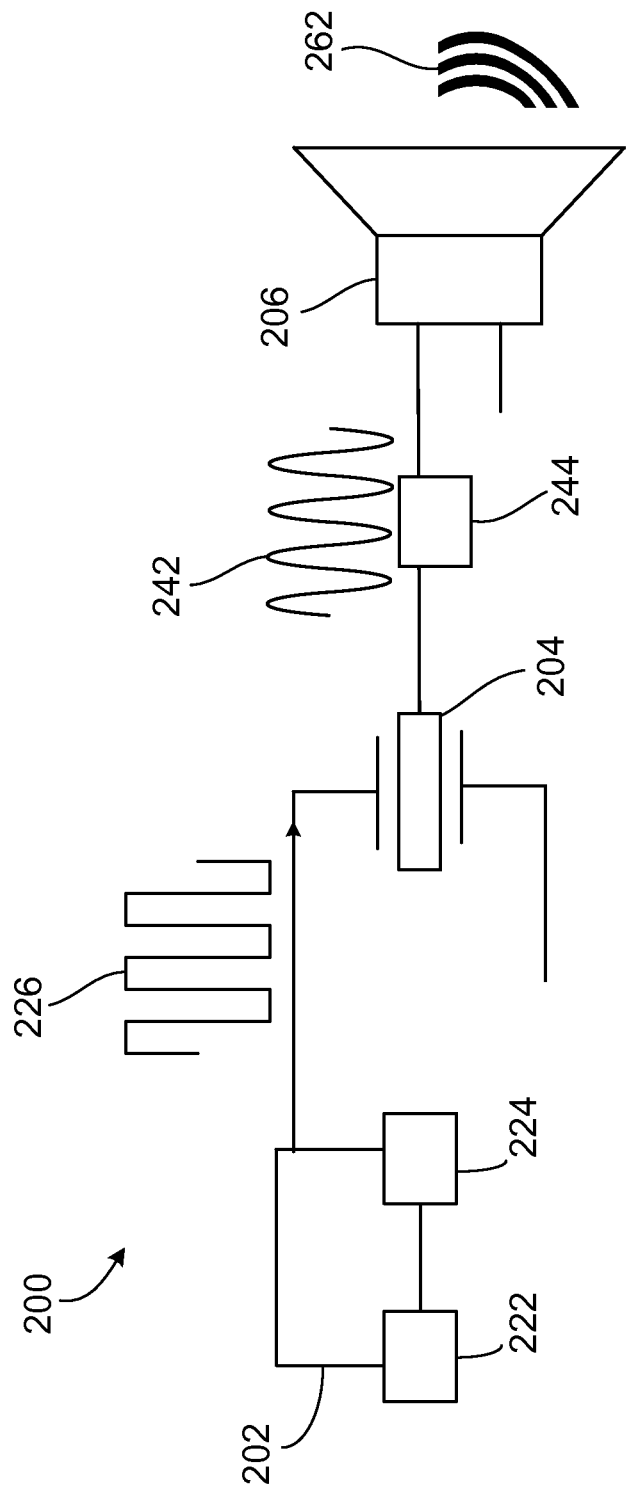
FIG. 2 is a block diagram of electronic components.

FIG. 2 shows a block diagram of the electronic components 200 of the audio cue device 100. The electronic components 200 include a rangefinder mechanism 202, a transducer 204, and a speaker 206. The rangefinder mechanism 202 has a signal emitter 222 and a signal receiver 224. For example, the signal emitter 222 can emit a signal such as an infrared signal, and the signal receiver 224 can receive the signal as reflected off of a distant object. The rangefinder mechanism 202 communicates a distance signal 226 to the transducer 204. The transducer 204 receives the distance signal 226 and converts the distance signal 226 to an audio signal 242. The transducer 204 communicates the audio signal 242 to the speaker 206 which converts the audio signal 242 to audible sound waves 262 to be detected by a human ear. In some implementations, the audio signal 242 is modified by another component before being communicated to the speaker 206. For example, an audio circuit 244 may increase or decrease the frequency of the audio signal 242 to bring the audio signal 242 within a certain frequency range so that the audible sound waves 262 have a desired frequency. For example, the audio circuit 244 may adjust the frequency of the audio signal 242 based on settings entered using the user controls 118 (FIG. 1). In some implementations, the audio circuit 244 is a sawtooth circuit that outputs a sawtooth wave.

In some examples, the electronic components 200 also include a power source, resistors (such as resistors used to configure the signals handled by the transducer and speaker), capacitors, inductors, and other electronic components. For example, the electronic components 200 can be powered by a solar cell, a battery, another type of power source, or a combination of power sources. The audio cue device 100 could be powered by a solar panel as a primary power source and the audio cue device 100 could also include a battery as a secondary, back-up power source used when the solar panel is not exposed to light.

Although the example of a human being is used, a variant of the audio cue device 100 could be used with another vision-impaired being such as an animal trained to respond to the audio cues.

Although the audio cue device 100 is described in the context of augmenting impaired depth perception, the device could also be used in other situations where audio cues about distance could be helpful, for example, in a setting in which visibility is poor (e.g. a low light situation), a live action game, a combat setting, or an industrial setting.

It is to be understood that the foregoing description is intended to illustrate and not to limit the scope of the invention, which is defined by the scope of the appended claims. Other embodiments are within the scope of the following claims.

What is claimed is:

1. An apparatus comprising
a frame configured to engage an ear of a user;
a rangefinder mechanism configured to measure a distance of an object, the rangefinder mechanism comprising:
a transmitter of a reflectable signal,
a receiver of the reflectable signal, and
output circuitry configured to transmit a distance signal indicative of a location of the object,
wherein the rangefinder mechanism is associated with the frame and oriented such that the transmitter of the reflectable signal emits the reflectable signal in a direction within a field of vision of the user associated with the frame;
a transducer configured to receive the distance signal from the rangefinder mechanism and configured to transmit an audio signal; and
a speaker configured to receive the audio signal and to emit an audible tone.

2. The apparatus of claim 1, further comprising a user control configured to adjust a frequency range of the audio signal.

3. The apparatus of claim 1, further comprising a user control configured to enable and disable the speaker.

4. The apparatus of claim 1, in which the reflectable signal comprises an infrared signal.

5. The apparatus of claim 1, in which the frame comprises an eyeglass frame.

6. The apparatus of claim 1, in which the speaker comprises a configurable output frequency range.

7. The apparatus of claim 1, in which the audible tone produced by the speaker changes as the distance signal changes.

8. The apparatus of claim 1, in which the audible tone produced by the speaker increases in frequency as the distance signal indicates a decreasing distance.

9. The apparatus of claim 1, in which the audible tone produced by the speaker decreases in frequency as the distance signal indicates an increasing distance.

10. The apparatus of claim 1, comprising an eye tracker.

11. The apparatus of claim 1, wherein the frame is configured to be worn on a human head.

12. The apparatus of claim 1, wherein the transmitter of the reflectable signal emits the reflectable signal in a direction parallel to a line of sight of eyes of a user wearing the frame.

13. The apparatus of claim 1, wherein the speaker is attached to the frame.

14. The apparatus of claim 1, wherein the rangefinder mechanism is attached to the frame.

15. A method, comprising
measuring a distance of an object by emitting a reflectable signal in a direction within a field of vision of a user wearing a frame, the frame configured engage an ear of a user;
generating a distance signal indicative of a location of the object, the distance signal based on the reflectable signal;
generating an audio signal based on the distance signal; and
emitting an audible tone corresponding to the audio signal.

16. The method of claim 15, comprising changing the audible tone as the distance signal changes.

17. The method of claim 15, comprising increasing the audible tone in frequency as the distance signal indicates a decreasing distance.

18. The method of claim 15, comprising decreasing the audible tone in frequency as the distance signal indicates an increasing distance.

19. An apparatus comprising
a frame configured to engage an ear of a human being; and
a mechanism configured to measure a distance of an object, the mechanism comprising:

a transmitter of a first signal,
a receiver of the first signal, and
output circuitry configured to transmit a second signal indicative of a location of the object,
an output device configured to, based on the second signal, provide an output detectable by a human being associated with the frame,
wherein the mechanism is associated with the frame and oriented such that the transmitter of the first signal emits the first signal in a direction within a field of vision of the human being associated with the frame.

20. The apparatus of claim 19, comprising a transducer configured to receive the distance signal from the mechanism and configured to transmit an audio signal.

21. The apparatus of claim 20, wherein the output device comprises a speaker configured to receive the audio signal and to emit an audible tone.

22. The apparatus of claim 19, wherein the output detectable by the human being associated with the frame varies based on a distance of the object.

23. The apparatus of claim 19, wherein the output device is attached to the frame.

24. The apparatus of claim 19, wherein the mechanism is attached to the frame.

* * * * *